US012352276B2

(12) United States Patent
Chambhare

(10) Patent No.: US 12,352,276 B2
(45) Date of Patent: Jul. 8, 2025

(54) CONTROL SYSTEM FOR CONTROLLING A SUBSEA GAS COMPRESSION SYSTEM

(71) Applicant: Vetco Gray Scandinavia AS, Sandvika (NO)

(72) Inventor: Sudhir Chambhare, Oslo (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 15/573,859

(22) PCT Filed: May 9, 2016

(86) PCT No.: PCT/EP2016/060297
§ 371 (c)(1),
(2) Date: Nov. 14, 2017

(87) PCT Pub. No.: WO2016/180763
PCT Pub. Date: Nov. 17, 2016

(65) Prior Publication Data
US 2018/0258940 A1 Sep. 13, 2018

(30) Foreign Application Priority Data
May 14, 2015 (NO) .................................. 20150611

(51) Int. Cl.
*F04D 25/06* (2006.01)
*F04D 27/02* (2006.01)
(52) U.S. Cl.
CPC ..... *F04D 25/0686* (2013.01); *F04D 27/0215* (2013.01); *F04D 27/0261* (2013.01)
(58) Field of Classification Search
CPC ............. F04D 25/0686; F04D 27/0215; F04D 27/0261; F04B 17/03; F03B 13/10; E21B 33/0355
(Continued)

(56) References Cited

U.S. PATENT DOCUMENTS 5,166,677 A * 11/1992 Schoenberg ........ E21B 33/0355
166/335
5,646,458 A 7/1997 Bowyer et al.
(Continued)

FOREIGN PATENT DOCUMENTS

EP 2 042 743 A1 4/2009
EP 2 194 638 A2 6/2010
(Continued)

OTHER PUBLICATIONS

Office Action and Search issued in connection with corresponding NO Application No. 20150611 on Dec. 9, 2015.
(Continued)

*Primary Examiner* — Connor J Tremarche
(74) *Attorney, Agent, or Firm* — Baker Hughes Patent Organization

(57) ABSTRACT

A control system for a subsea gas compression system. The control system includes a subsea control system comprising a plurality of process sensors measuring process parameters of the compression system, a compressor controller configured to generate control commands controlling the motor and the valve based on measurements of the process parameters from the sensors, and an electric device including hardware and software. The electric device is arranged to receive measurements from the process sensors and the compressor controller is integrated in the electric device. The electric device is any of an actuator for controlling the valve position, a variable speed drive for controlling the motor driving the compressor by adjusting the frequency of the power supplied to the motor, a switchgear connected to the variable speed drive for turning on and off the variable speed drive, or an uninterruptible power supply for providing emergency power to the control system.

15 Claims, 8 Drawing Sheets

(58) Field of Classification Search
USPC .......................................................... 417/44.2
See application file for complete search history.

(56) References Cited

U.S. PATENT DOCUMENTS

| | | | |
|---|---|---|---|
| 6,448,747 B1 | 9/2002 | Lestician | |
| 2002/0024788 A1 | 2/2002 | Lestician | |
| 2007/0231072 A1* | 10/2007 | Jennings | F03B 13/10 |
| | | | 405/75 |
| 2009/0044951 A1* | 2/2009 | Milkovisch | E21B 49/10 |
| | | | 166/369 |
| 2009/0200035 A1 | 8/2009 | Bjerkreim et al. | |
| 2010/0061028 A1 | 3/2010 | Lestician | |
| 2012/0121376 A1* | 5/2012 | Huis In Het Veld | ...................... |
| | | | F04D 27/0261 |
| | | | 415/17 |
| 2012/0328410 A1* | 12/2012 | Narayanan | F04D 27/0207 |
| | | | 415/1 |
| 2013/0156544 A1* | 6/2013 | Sishtla | F04D 29/058 |
| | | | 415/170.1 |
| 2013/0168554 A1* | 7/2013 | Howe | G01D 11/26 |
| | | | 250/358.1 |
| 2014/0003963 A1* | 1/2014 | Wessel | F04B 17/03 |
| | | | 417/44.1 |

FOREIGN PATENT DOCUMENTS

| | | |
|---|---|---|
| EP | 2 530 326 A2 | 12/2012 |
| EP | 2 679 766 A2 | 1/2014 |
| WO | 2006/132541 A1 | 12/2006 |
| WO | 2007/055587 A1 | 5/2007 |
| WO | 2011/066050 A1 | 6/2011 |

OTHER PUBLICATIONS

International Search Report and Written Opinion issued in connection with corresponding PCT Application No. PCT/EP2016/060297 dated Jul. 25, 2016.

* cited by examiner

CONTROL SYSTEM FOR CONTROLLING A SUBSEA GAS COMPRESSION SYSTEM

FIELD OF THE INVENTION

The present invention relates to control system for controlling a subsea gas compression system including a compressor, an electric motor driving the compressor, and at least one valve for controlling a flow through the compressor. The present invention further relates to a subsea gas compression system.

BACKGROUND OF THE INVENTION

Compressors are widely used worldwide in industrial applications to compress gas. A traditional subsea compression system includes a compressor, an electric motor driving the compressor, one or more valves, and a cooler for controlling a flow through the compressor. The compression system may also include pumps and pressure vessels, such as liquid/gas separators. The compression system is controlled by a control system including control equipment.

A phenomenon known as compressor surge can occur in the compression system due to reduced flow with respect to differential pressure across the compressor. Compressor surge condition can lead to vibration in the compressor shaft and serious damage to the compressor. To prevent a compressor from going into surge an anti-surge valve is used to recycle flow from the outlet of the compressor to the inlet of the compressor. The anti-surge valves are normally control valves, which can take any position between open and closed. A surge controller is used to control the operation of the anti-surge valve. The surge controller takes necessary control action to prevent the compressor from surge, by opening the anti-surge valve to recirculate the gas flow with respect to pressure differences across the compressor. This is a time critical loop involving fast responses from sensors, controllers and actuators.

EP2042743 discloses an example of a prior art gas compression system including an anti-surge valve, an anti-surge actuator for actuating the valve, and a surge controller receiving measurement from sensors and adapted to generate a signal for controlling the opening and closing of the anti-surge valve. The actuator actuates the anti-surge valve in response to the signal from the surge controller. In the disclosed system, the surge controller is a separate controller, which is arranged separated from the other controllers of the compression system.

FIG. 1 shows an example of a prior art subsea compression system including a compressor 1, an electric motor 2 driving the compressor, and an anti-surge valve 3. The compression system may also include isolation valves (not shown). The compression system further includes a control system for controlling the compressor. The control system includes a topside control system 5 arranged above the sea level, and a subsea control system 6. The topside control system typically comprises a PLC having electronic cards, such as CPU, communication interface with units of subsea control system 6. The subsea control system 6 includes a general control unit 7 for controlling the anti-surge valve and the speed of the motor. The general control unit 7 comprises hardware 7a, typically including a PLC having electronic cards, such as CPU, sensors interface electronic cards for receiving measured values from the process sensors 8-10, and communication electronic cards for communication with an actuator 12 of the anti-surge valve 3 and with a variable speed drive 14. The general control unit 7 further comprises hardware 7b for operating other components and sensors in the compression system. The hardware 7b typically comprises communication electronic cards, sensors interface electronic cards and fieldbus communication cards.

The topside control system 5 sends control commands to the general control unit 7. The subsea control system communicates with the topside control system via a control cable (umbilical) which terminates subsea at an umbilical termination assembly 18. The subsea control system further comprises a plurality of process sensors 8-10 for measuring process parameters of the compression system, such as, pressure at an inlet and/or outlet of the compressor, temperature at the inlet and/or outlet of the compressor, and flow through the compressor. Other process sensors can be present in the system, such as a sensor for measuring the speed of the compressor. Data measured by the process sensors is collected by the general control unit 7.

The control system further includes an electric anti-surge actuator 12 for actuating the position of the anti-surge valve 3, and a variable speed drive (VSD) 14 for controlling the speed of the motor 2 by producing power of a variable frequency to the motor 2.

The anti-surge actuator 12 comprises an electric motor 4 for moving the anti-surge valve 3, and an actuator drive unit 12a including electric power components for controlling the motion of the motor 4. The anti-surge valve 3 can be provided with a sensor (not shown) sensing the position of the anti-surge valve. The anti-surge actuator 12 further comprises an embedded controller 12b including a position control loop for controlling the position of the anti-surge valve 3 based on the measured positions of the anti-surge valve and commands for opening and closing the anti-surge valve from the general control unit 7.

The variable speed drive comprises power electronic components 14a including a frequency converter for producing power of a variable frequency to the compressor motor 2. The variable speed drive 14 further comprises an embedded controller 14b for controlling the speed of the compressor motor 2 based on speed commands from the general control unit 7. The speed commands are generated based on the process parameters measured by the process sensors.

The control system may further include a switchgear (SWG) 16 connected to the variable speed drive 14 for turning on and off the current produced by the variable speed drive. The control system may also include an Uninterruptible Power Supply (UPS) for providing back up power to the compression control system equipment.

The general control unit 7 generates control commands to the anti-surge actuator 12 and the variable speed drive 14. The general control unit 7 also includes a compressor controller 22 including one or more software control modules running on the PLC of hardware 7a of the general control unit 7 for controlling the compressor. The process sensors 8-10 are interfaced with hardware 7a of the general control unit 7. One of the control modules is a surge control module. The surge control module is configured to generate control commands for opening and closing the anti-surge valve 3 based on measurements of the process parameters from the process sensors 8-10 and possibly commands from the topside control system 5. The anti-surge actuator 12 moves the valve 3 in response to the commands from the compressor controller 22. Another of the software control modules is a motor speed control module configured to generate speed commands for the motor 2 based on the measurements of process parameters. The variable speed drive 14 receives the speed commands from the motor control module and produces power of a variable frequency to the motor in response to the speed commands from the compressor controller 22.

A problem with subsea control systems is that the demands on the control equipment is higher than for topside control equipment. Thus, electronic controllers from topside cannot be mounted subsea as they are. They have to be redesigned and go through a qualification process like shock and vibration tests, thermal cycling, and hyperbaric pressure tests as per ISO 13268-6 specs. This redesigned and qualification process is in the following denoted marinization. Accordingly, a disadvantage of the prior art subsea control system is that the control system needs dedicated and marinized electronic cards, communication system, and electronic controllers (PLC cards).

A further disadvantage of the prior art subsea control system is that there is an inherited communication delay for the data processing inside the subsea control system and in sending commands to the anti-surge actuator and variable speed drive.

SUMMARY OF THE INVENTION

It is an object of an embodiment of the present invention to provide a control system for controlling a subsea gas compression system that at least partly overcome the above mentioned problems.

This object is achieved by a control system as defined in claim 1.

The control system including a subsea control system comprising a plurality of process sensors for measuring process parameters of the compression system, a compressor controller configured to generate control commands for controlling the motor and the valve based on measurements of the process parameters from the sensors and remote control commands, and an electric device including hardware and software for influencing a part of the gas compression system. The electric device is arranged to receive measurements from the process sensors, the compressor controller is integrated in the electric device, and the electric device is any of an actuator for controlling the position of the valve, a variable speed drive for controlling the speed of the motor driving the compressor by adjusting the frequency of the power supplied to the motor, a switchgear connected to the variable speed drive for turning on and off the variable speed drive, or an uninterruptible power supply for providing emergency power to the control system.

All components of the subsea control system are located subsea.

Many electric devices, such as actuators, variable speed drives, switchgears, and uninterruptible power supplies, in the subsea part of the control system are equipped with hardware such as embedded processors, communication cards, power and communication connectors and internal sensor cards. According to an embodiment of the invention, the hardware of one of the already existing electric devices in the system is utilized for storing and executing the compressor controller. By use of readily available subsea resources, the dedicated hardware 7a of the subsea control system required for this application, such as the PLC electronic cards, sensors interface electronic cards, and communication electronic cards, can be eliminated. Accordingly, the control system according to an embodiment the invention has reduced hardware costs compared to the prior art control system. Further, the space requirement to facilitate the mentioned hardware of the subsea control system can be reduced. Further, marinization of typical electronic controllers, such as PLC electronic cards, can be avoided, which will provide considerable cost saving. An embodiment of the present invention will enable the efficient use of existing controllers readily available in the loop, such as controller in actuators/VSD/SWG/UPS.

The process sensors are adapted to measure process parameters of the compression system, such as, pressure at an inlet and/or outlet of the compressor, temperature at the inlet and/or outlet of the compressor, and flow through the compressor. The electric device can be arranged to directly receive measurements from the process sensors, or indirectly via another unit, for example, the general control unit 7.

The electric device including the compressor controller is, for example, an actuator for controlling the position of a valve in response to control commands from the compressor controller, or a variable speed drive (VSD) for controlling the speed of the motor driving the compressor by adjusting the frequency of the power supplied to the motor in response to control commands from the compressor controller, or a switchgear connected to the variable speed drive for turning on and off the variable speed drive, or an uninterruptible power supply (UPS) for providing emergency power to the control system. The actuator is, for example, an actuator for the anti-surge valve or an actuator for an isolation valve. The variable speed drive is producing power of a variable frequency to the motor.

The electric device has computational capabilities, which are used to control the gas compression system in response to control commands from the compressor controller or from a topside control system. For example, the hardware of the electric device comprises a processing unit, a sensor interface, and an output interface. Further, the electric device may comprise program storage, sensor cards and communication cards. The sensor interface of the electric device is connected to the process sensors, the compressor controller includes one or more software control modules for generating said control commands, and the processing unit of the electric device is configured to execute the control modules of the compressor controller.

According to an embodiment of the invention, the electric device is surrounded by a water-tight housing, and the compressor controller is arranged inside the water-tight housing.

According to an embodiment of the invention, the sensor interface of the electric device is connected to the process sensors, the compressor controller includes one or more software control modules for generating the control commands, and the control modules are stored in the program storage of the electric device. The processing unit of the electric device is configured to execute the control modules of the compressor controller. The communication interface of the control modules may be configured to output at least some of the control commands.

According to an embodiment of the invention, the valve is an anti-surge valve for preventing surge of the compressor, the compressor controller comprises a surge control module configured to generate commands for opening and closing of the anti-surge valve based on measurements of the process parameters in order to prevent surge of the compressor. The control system comprises an anti-surge actuator for actuating the anti-surge valve in response to control commands from the surge control module. The anti-surge actuator is adapted to perform a position control loop for the anti-surge valve.

According to an embodiment of the invention, the compressor controller comprises a motor control module configured to generate speed commands for the compressor motor based on measurements of process parameters, and the subsea control system comprises a variable speed drive (VSD) for controlling the speed of the motor driving the compressor by adjusting the frequency of the power supplied to the motor in response to the speed commands from the motor control module.

According to an embodiment of the invention, the anti-surge actuator is provided with a sensor interface arranged to receive measurements from the process sensors, and the compressor controller is integrated in the anti-surge actuator. Electric actuators, and in particular anti-surge actuators, are in general equipped with their own embedded controllers, communication cards, power and communication connectors and internal sensor cards. The controllers have computational capabilities, which are used to control the speed of actuator motors to perform the commanded valve stem movement.

Suitably, the compressor controller comprises a motor control module as well as a surge control module. The embedded controller of the anti-surge actuator then executes the surge control loop as well as the compressor speed control loop. The controller of the anti-surge actuator will then compute the control commands to the VSD speed regulation in addition to the control commands to the anti-surge actuator motor control.

According to an embodiment of the invention, the system comprises a variable speed drive provided with a sensor interface arranged to receive measurements from the process sensors, and the compressor controller is integrated in the variable speed drive. VSDs are in general equipped with their own embedded controllers, communication cards, power and communication connectors and internal sensor cards. The controller has computational capabilities, which are used to control the current supplied to the compressor motor in order to achieve the commanded compressor speed. In this embodiment, the embedded controller of the variable speed drive is programmed to perform the compressor speed control loop. Suitably, the compressor controller comprises a motor control module as well as a surge control module. Then, the controller of the variable speed drive will compute the control commands to the anti-surge actuator motor control in addition to control commands to the VSD speed regulation.

According to an embodiment of the invention, one said electric devices is a switchgear connected to the variable speed drive for turning on and off the variable speed drive, and the compressor controller is integrated in the switchgear.

According to an embodiment of the invention, one of said electric devices is an Uninterruptible Power Supply unit (UPS) for providing emergency power to the control system, and the compressor controller is integrated in the Uninterruptible Power Supply unit.

According to an embodiment of the invention, the control system comprises a topside control system disposed above the sea, and the compressor controller is configured to receive remote control commands from the topside control system, to generate subsea control commands for controlling the motor and valve based on measurements from the process sensors in absence of remote control commands, and to follow the remote control commands upon receiving remote control commands. The algorithms inside the electric device decides which control commands have to be considered; the remote control commands from the topside control system, or the locally generated control commands. In this embodiment, the remote control commands are prioritized. This embodiment provides a fallback solution to any other remotely located compressor control module. If the control command is not received from the remote controller within a time frame, the subsea surge control module will issue the command. Thus, the subsea compressor controller can also act as a redundant solution to handle the delays/loss of the communication with a remotely located control system.

An embodiment of the invention further relates to a subsea gas compression system comprising a compressor, an electric motor driving the compressor, and at least one valve for controlling a flow through the compressor, and a control system for controlling the compressor.

BRIEF DESCRIPTION OF THE DRAWINGS

The invention will now be explained more closely by the description of different embodiments of the invention and with reference to the appended figures.

DETAILED DESCRIPTION

Figure 1:
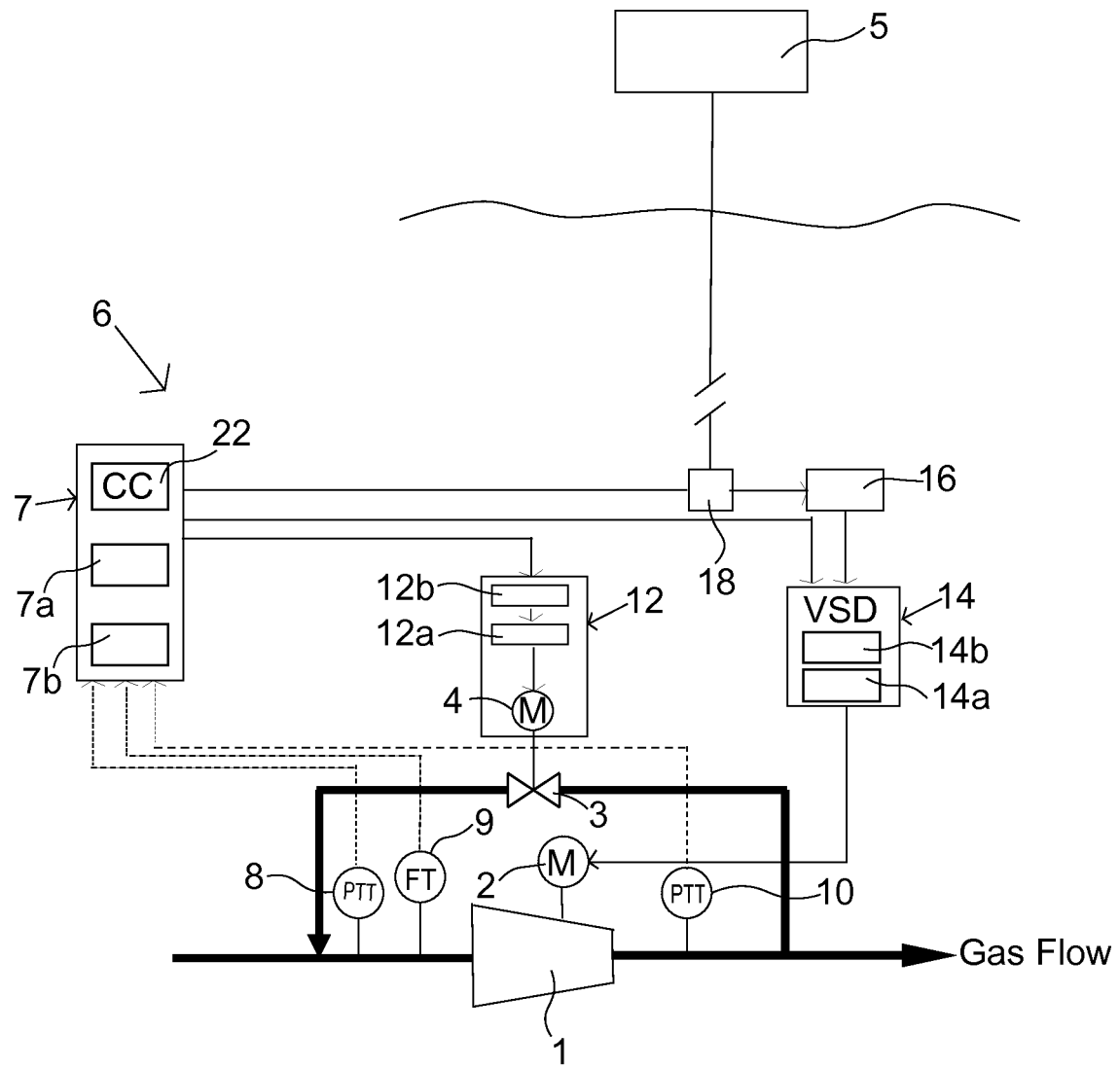
FIG. 1 shows a prior art subsea compression system including a control system.
Figure 2:
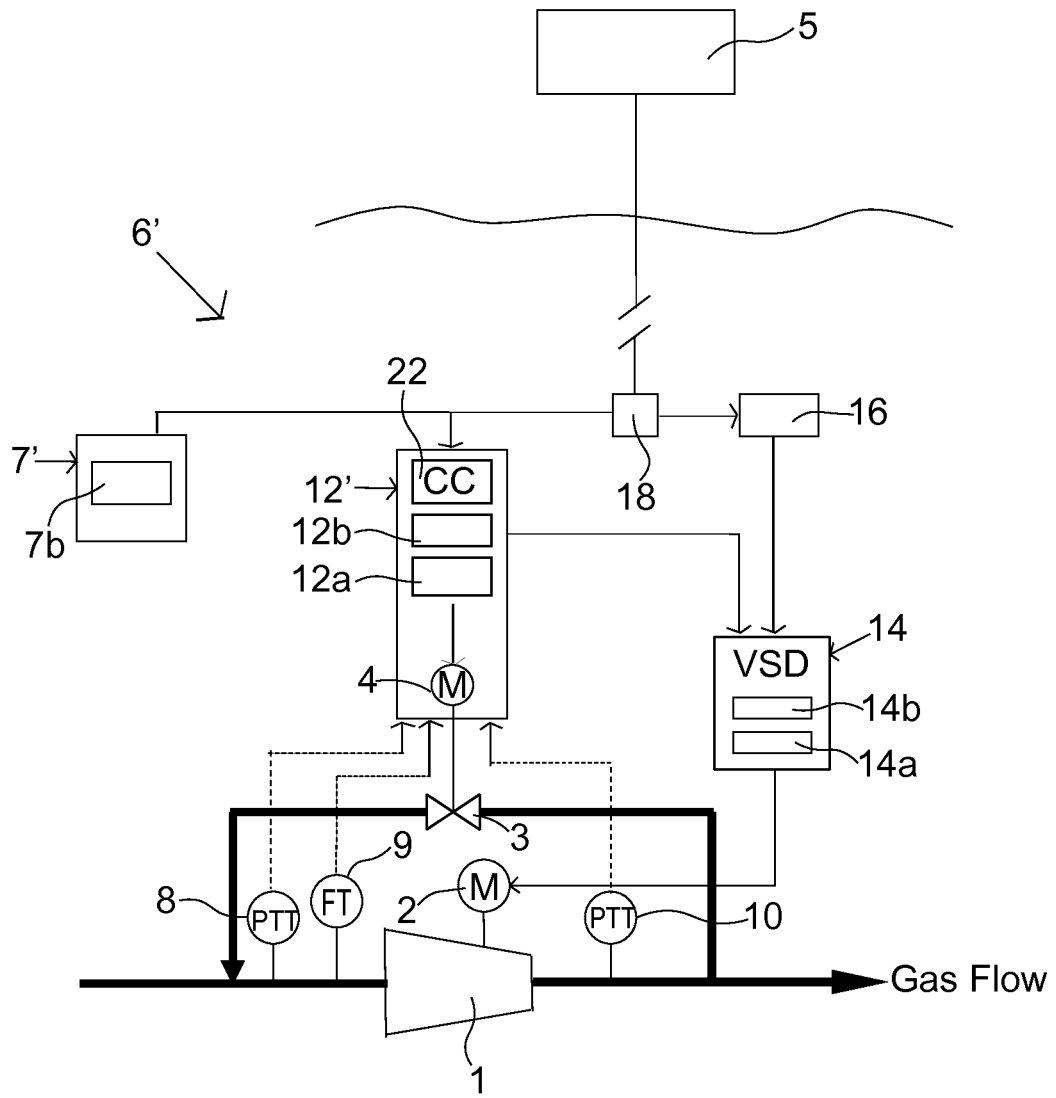
FIG. 2 shows a subsea compression system including a control system.

FIG. 2 shows an embodiment of subsea compression system including a subsea control system 6' according to an embodiment of the invention. The compression system comprises a compressor 1. The compressor 1 receives gas through an inlet pipe and provides compressed gas through an outlet pipe. The compressor 1 is driven by an electric motor 2, in the following called the compressor motor. The compression system further comprises a gas recycle loop including an anti-surge valve 3. The gas recycle loop feeds back compressed gas from the outlet of the compressor 1 to the inlet of the compressor in order to keep a steady gas flow through the compressor whenever required. In this example, the subsea compression system also includes a cooler (not shown) located upstream of the anti-surge valve 3.

The compression system further includes a control system for controlling the compressor. The control system includes a topside control system 5 arranged above the sea level, and a subsea control system 6'. The topside control system 5 sends control commands to the subsea control system 6'. The subsea control system comprises a communication unit 18 for communicating with the topside control system. The subsea control system further comprises a plurality of process sensors 8, 9, 10 for measuring process parameters of the compression system, such as pressure at an inlet and/or outlet of the compressor, temperature at the inlet and/or outlet of the compressor, and the gas flow through the compressor. In this example, sensors 8 and 10 are Pressure Temperature Transmitter PTT) sensors arranged at the inlet and outlet of the compressor, and sensor 9 is a Flow Transmitter (FT) at the inlet of the compressor. Other sensors can be present in the system, such as a sensor for measuring the speed of the compressor.

The control system further includes a Variable Speed Drive (VSD) 14 for controlling the speed of the compressor motor by adjusting the frequency of power supplied to the compressor motor. The VSD produces a variable frequency to the compressor motor 2. The variable speed drive 14 supplies the compressor motor 2 with power and controls the speed of the motor 2 by varying the frequency of the supplied power. The VSD is supplied with AC voltage from a power source (not shown). The variable speed drive 14 comprises power electronic components 14A including a frequency converter for adjusting the frequency of the power from the power source before supplying the power to the compressor motor.

The variable speed drive further comprises an embedded controller 14b. In the following the embedded controller 14b is named VSD controller 14B. The VSD controller 14B includes hardware such as program storage, a processing unit, sensor cards, a sensor interface, a communication card, and a communication interface. The processing unit includes, for example PLC electronic cards, or any other form of embedded controller cards with a CPU (having programmable logic solver capability). The VSD controller 14B further includes hardware and software for controlling the speed of the compressor motor 2 based on speed commands including speed references from a compressor controller. The VSD controller will apply the speed reference commanded by the compressor controller.

The control system may further include a switchgear 16 connected to the variable speed drive 14 for turning on and off the power supply to the variable speed drive, in response to commands from the topside control system 5.

The control system further includes an anti-surge actuator 12' for actuating the opening and closing of the anti-surge valve 3. The anti-surge actuator 12' comprises an electric motor 4, in the following named an actuator motor, for moving a stem of the anti-surge valve 3, and an actuator drive unit 12A including electric power components for controlling the motion of the actuator motor 4. The anti-surge actuator can also be provided with a position sensor (not shown) to detect the position of the actuator valve stem. The anti-surge actuator 12' further comprises an embedded controller 12B including a position control loop for controlling the position of the anti-surge valve 3 based on the measured positions of the anti-surge valve and commands for opening and closing the anti-surge valve. In the following, the embedded controller 12B is named an actuator controller 12B. The actuator controller 12B comprises hardware as well as software for carrying out the position control loop for the anti-surge valve. The hardware of the actuator controller 12B comprises program storage, a processing unit, sensor cards, a sensor interface, one or more communication card, and a communication interface. The processing unit includes, for example PLC electronic cards or any other form of embedded controller cards with a CPU (having programmable logic solver capability).

The actuator controller 12b further comprises a software actuator control module configured to determine reference values for the actuator motor 4. The reference values are motor angles corresponding to positions of the anti-surge valve. The actuator control module is, for example, configured to determine motor angles for the actuator motor 4 based on a predefined opening curve for the valve. The actuator control module further includes software for carrying out the position control loop for the anti-surge valve. The position control loop is configured to determine motor angles for the actuator motor 4 based on the measured positions of the valve stem and the reference values. The actuator drive unit 12A is configured to receive the motor angles from the actuator control module 12B and to control the actuator motor 4 to achieve the determined motor angles.

The subsea control system further includes a compressor controller 22 including one or more software control modules for controlling the compression system based on measurements of the process parameters, such as pressure, temperature, or flow of the compressor. One of the control modules is a surge control module configured to generate control commands for opening and closing the anti-surge valve 3 based on measurements of the process parameters from the process sensors 8-10. Another of the software control modules is a motor speed control module configured to generate speed commands including speed references for the compressor motor 2 based on the measurements of process parameters. In this embodiment of the invention, the compressor controller 22 is integrated in the anti-surge actuator 12'. The compressor controller 22 uses the hardware of the actuator controller 12B. The software modules of the compressor controller 22 are executed by the processing unit of the actuator controller 12B of the anti-surge actuator 12'. Thus, the software of the compressor controller 22 and the software of the actuator control module are executed on the same processing unit. The anti-surge actuator 12' comprises a housing surrounding the actuator drive unit 12a and the actuator controller 12B. In this embodiment, the compressor controller 22 is arranged inside the housing of the anti-surge actuator 12'.

The sensors 8-10 for measuring pressure, temperature and flow are connected to the sensor interface of the actuator controller 12b of the anti-surge actuator 12'. Data measured by the sensors 8-10 representing process parameters are collected by the compressor controller 22. The compressor controller 22 is configured to generate control commands to the actuator control module and the variable speed drive 14 based on the measured process parameters. The compressor controller 22 also receives control command from the topside control system 5.

The system may also include a control unit 7' that comprises hardware 7b for operating other components and sensors in the compression system, for example instrumentation and valves in a subsea cooler, the switchgear 16, which has its own controller to turn the circuit breakers ON/OFF and many internal protection functions (including earth faults, overcurrent and high voltage protection etc.), sensors on the motor, an UPS, and isolation valves and sensors before and after the compressor, which will be commanded and monitored externally from 5. The hardware 7B typically comprises communication electronic cards, sensors interface electronic cards and fieldbus communication cards.

One of the control modules of the compressor controller 22 is a surge control module. The surge control module is configured to generate control commands for the anti-surge valve 3 based on measurements of the process parameters from the sensors 8-10 and possibly commands from the topside control system 5. The control commands include commands for: when to open and close the anti-surge valve, and how much the anti-surge valve is to be opened or closed. The control commands for the anti-surge valve are sent to the actuator control module. The actuator control module is configured to control the actuator motor 4 in response to the control commands from the surge control module. The surge control module includes algorithms inside the actuator for deciding which control commands to be generated. An advantage with implementing the surge control module on the actuator controller 12B is that the time of the actuator position control loop will be reduced by having direct access to the process signals in real time environment.

In this embodiment, the surge control module and the actuator control module are executed by the same processing unit, i.e. the processing unit of the actuator controller 12B. By programming the embedded controller of the anti-surge actuator for the anti-surge valve to perform the surge control loop, reduction in the anti-surge control loop time can be achieved. The loop time will be reduced since the controller inside the anti-surge actuator has direct access to the process signals from the sensors in real time. The anti-surge valve with actuator will thus act as a smart valve. A subsea compression control system often requires dedicated communication equipment to execute the anti-surge loop. The space inside the general control unit 7 can be saved by avoiding the electronic PLC cards for the sensors interface and CPU for the purpose of the anti-surge control.

The surge control module is adapted to determine whether there is a risk of the compressor 1 entering into surge based on the measured process parameters, and to generate control commands to the actuator control module for opening and closing the anti-surge valve in order to avoid compressor surge. If the surge control module decides that there is a risk of surge, the surge control module commands opening of the anti-surge valve. The control signal to the actuator motor is generated according to PID calculations to give the opening of the anti-surge valve up to 100%. In this way, the compressor operation is maintained within the predefined compressor map to ensure its safe operation.

If the surge control module decides that there is no risk of surge of the compressor, the anti-surge valve is kept closed.

Another aspect of the software control modules of the compressor controller 22 is a motor speed control module configured to generate speed commands for the compressor motor 2 based on the measurements of the process parameters from the sensors and possibly commands from the topside control system 5. The variable speed drive 14 receives the speed commands from the motor control module of the compressor controller 22 and produces power of a variable frequency to the motor in response to the speed commands from the motor control module. In this embodiment, the surge control module, the motor control module, and the actuator control module are executed by the same processing unit, i.e. the processing unit of the actuator controller 12B.

Electric anti-surge actuators are in general equipped with their own embedded controllers, communication cards, power and communication connectors and internal sensors. The controllers have computational capabilities, which are used to control the speed of actuator motors to perform the valve stem movement. Additional external process sensors, VSD interfaces and internal sensors electronic cards can be added to have the access of real time process input and perform the anti-surge control algorithms. The embedded controller 12b of the anti-surge actuator will compute the control commands to the VSD speed regulation in addition to the actuator's own motor control.

Optionally, the compression system may further include one or more isolation valves. Each isolation valve having an electric actuator for actuating the opening and closing action of the isolation valve. The compressor controller 22 may include a software control module for generating commands to the actuator of the one or more isolation valves based on the measured process parameters.

This system arrangement can act as a redundant subsea anti-surge control system in addition to any remotely located anti-surge control systems. The subsea control system will work as a fallback solution to any other remotely located surge control module. If a control command is not received from the remote controller within a time frame, the subsea surge control module will issue the command.

Figure 3:
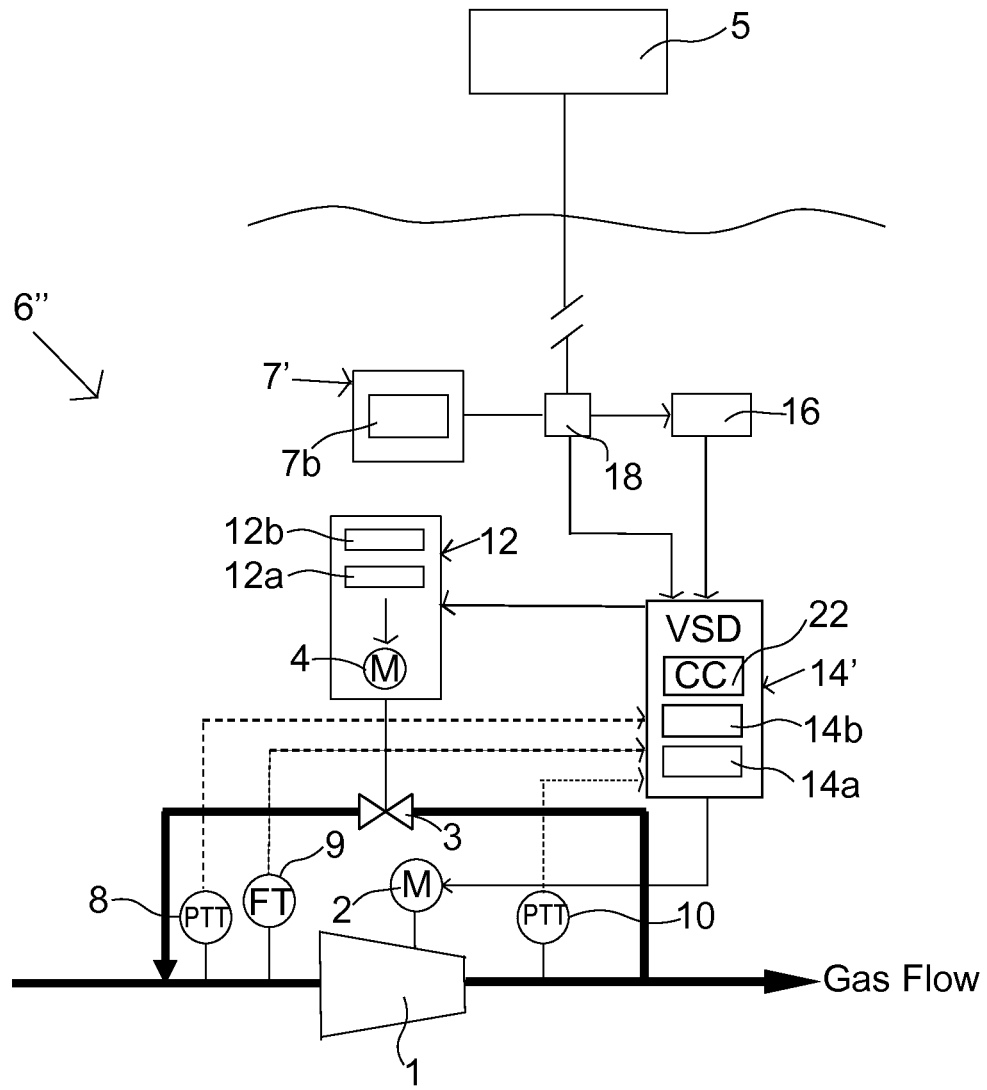
FIG. 3 shows a subsea compression system including a control system.

FIG. 3 shows a subsea compression system 6" including a control system according to an embodiment of the invention. Components corresponding to those in FIG. 2 have been given the same reference numerals, and will not be described in more detail here. As can be seen in the drawing, the system comprises a variable speed drive 14' for producing power of a variable frequency to the compressor motor 2. The sensor interface of the variable speed drive 14' is arranged to receive measurements from the process sensors 8-10, and to receive remote control commands from the topside control system 5. In addition to the power electric components 14A, including a frequency converter for producing power of a variable frequency to the compressor motor 2, and the VSD controller 14B, the variable speed drive 14' comprises a compressor controller 22 including one or more software control modules for controlling the compression system.

The compressor controller 22 is integrated in the variable speed drive 14'. The compressor controller 22 uses the hardware of the VSD controller 14B. The software modules of compressor controller 22 are executed by the processing unit of the VSD controller 14B of the variable speed drive 14'. The compressor controller 22 is configured to generate control commands to the actuator drive unit 12a and to the VSD speed drive 14a based on the measured process parameters. The compressor controller 22 also receives control commands, such as process set points, from the topside control system 5. The variable speed drive 14' comprises a housing surrounding the power electric components 14a and the VSD controller 14B. In this embodiment, the compressor controller 22 is arranged inside the housing of the variable speed drive 14'.

One of the control modules of the compressor controller 22 is a surge control module. The surge control module is configured to generate control commands for opening and closing the anti-surge valve 3 based on measurements of the process parameters from the sensors 8-10 and possibly commands from the topside control system 5. The control commands for the anti-surge valve are sent to the actuator controller 12B. In this embodiment, the surge control module, the motor control module, and the speed control module are executed by the same processing unit, i.e. the processing unit of the VSD controller 14B.

Optionally, the actuator control module is also executed on the VSD controller 14B. In that case, reference values for the actuator position are transferred to the actuator drive unit 12A.

Figure 4:
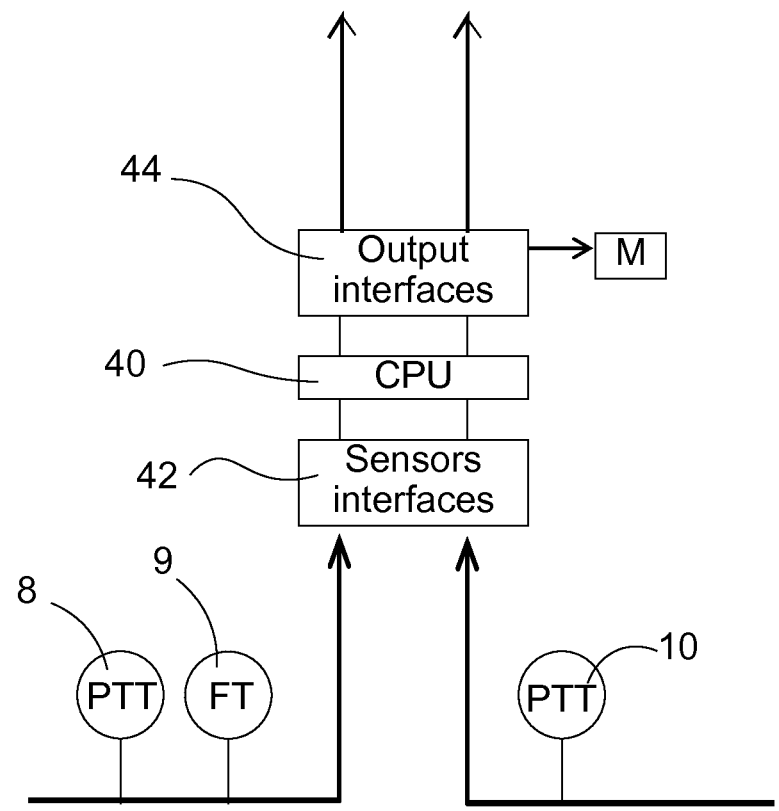
FIG. 4 shows an example of hardware of an embedded controller of an electric device.

FIG. 4 shows an example of the hardware of the actuator controller 12B and/or the VSD controller 14B used for the compressor controller. The hardware of the actuator controller 12B, and the VSD controller 14B, comprises a processing unit and program memory 40, sensor cards and a sensor interface 42, one or more communication card, and an output interface 44. The processing unit includes, for example, a CPU. The process sensors 8-10 are connected to the sensor interface 42. The output interface 44 output control commands to the power electric components 14A including the frequency converter and to the actuator drive unit 12A. In an embodiment of the invention, as shown in FIG. 2, the output interface 44 sends speed control commands to the VSD 14 and internal control commands to the actuator drive unit 12A. In an embodiment of the invention, as shown in FIG. 3, the output interface 44 sends control commands to the actuator 12 and speed commands to the internal power electric components 14A.

Figure 5:
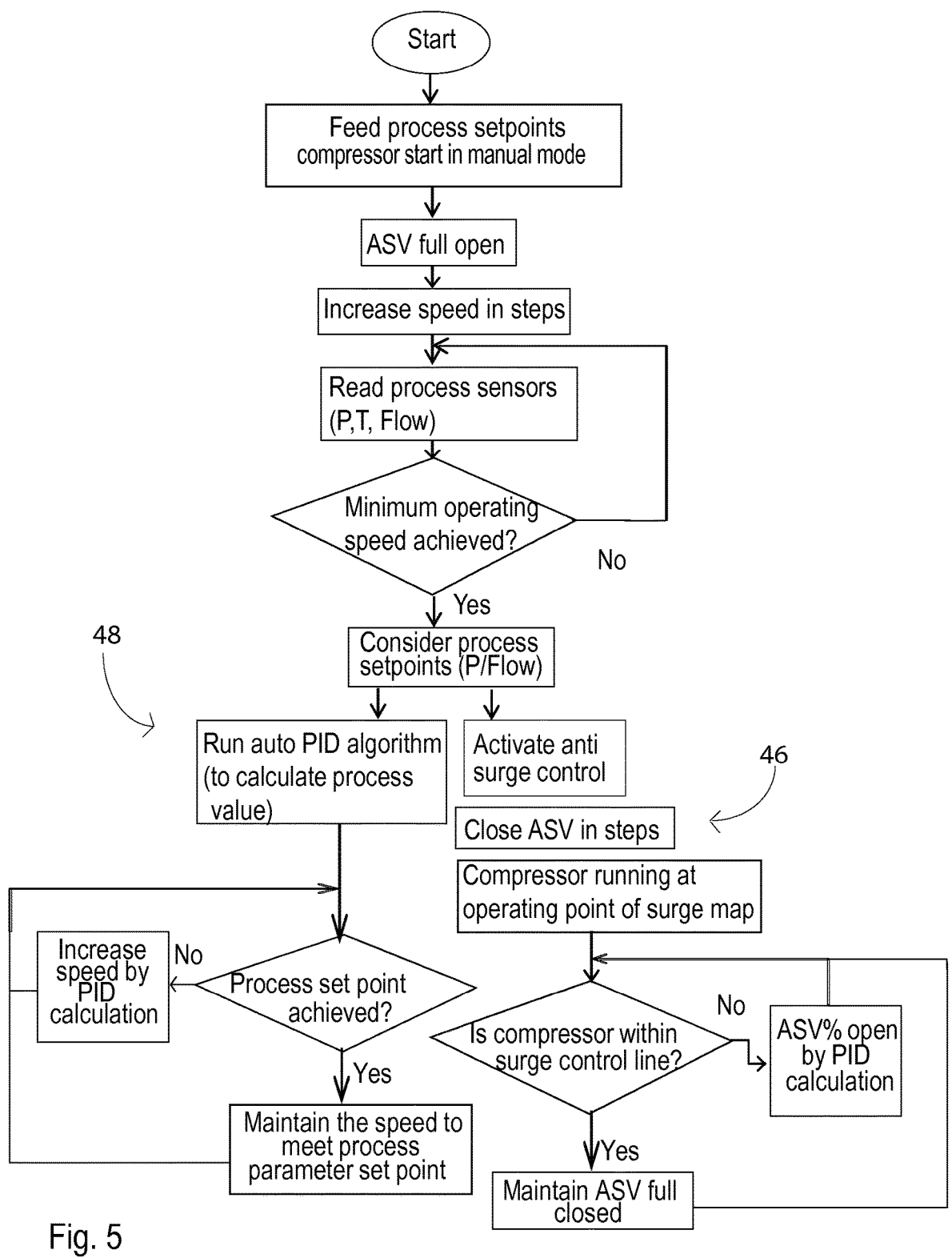
FIG. 5 shows a flow diagram illustrating typical anti-surge and compressor speed control.

FIG. 5 shows a flow diagram illustrating a typical algorithm for a compressor controller 22 including anti-surge control and compressor speed control.

The compressor startup preparations are performed by the operator. During a startup phase, the ASV is fully opened to 100% to enable the recycle of process gas through the compressor back to suction side. The compressor is started and speed is increased manually in steps after fulfill of necessary pre-requisite conditions. Once the minimum operating speed of the compressor is achieved, the compressor is ready to bring in auto mode to follow the operating pressure or flow set points provided by the operator in the startup preparations. The algorithm includes a surge control module 46 including an anti-surge control loop for controlling the anti-surge valve to avoid surge of the compressor, as well as a motor control module 48 for carrying out a speed control loop for controlling the speed of the compressor motor.

During the anti-surge control, the Anti Surge Valve (ASV) is closed in steps until the desired process set point is achieved, and it is ensured that the compressor is operating within the compressor surge map throughout its operation. The motor speed control module comprises a compressor speed closed loop control, including a PID algorithm adapted to increase or decrease the speed of the VSD based on the difference between the set-point and the real-time measured process parameters (pressure/flow).

Figure 6:
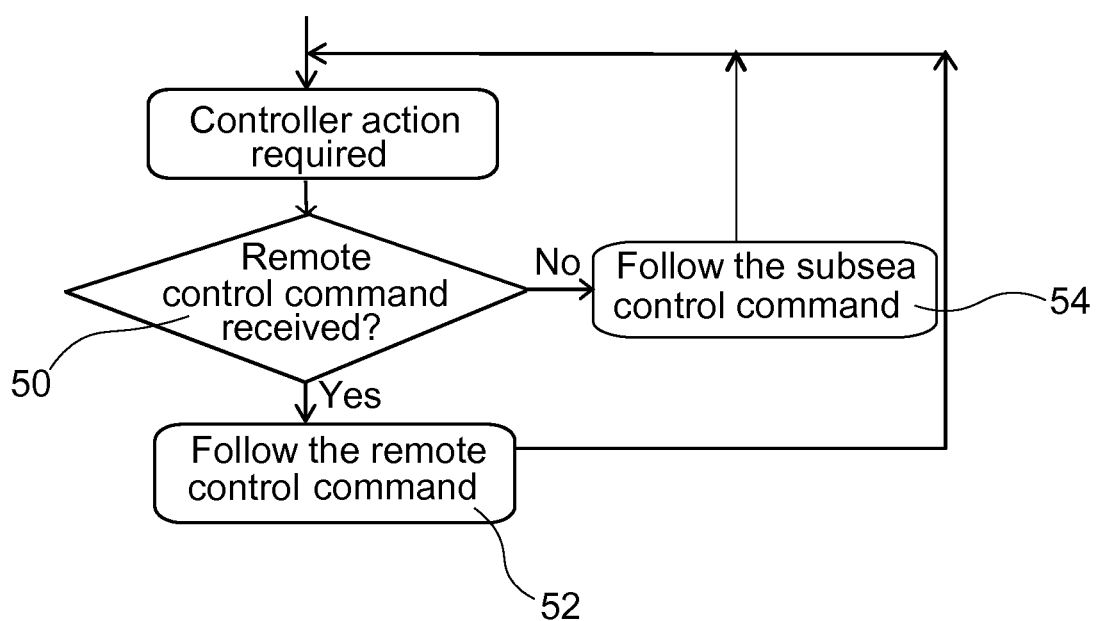
FIG. 6 shows a flow diagram illustrating prioritizing between remote and locally generated control commands.

FIG. 6 shows a flow diagram illustrating prioritizing between remote and subsea generated control commands, where the invention will act as a fallback solution if required. For example, the topside control unit may include a remote anti-surge and compressor motor speed controller. When control action is required, the topside control unit generates remote commands, which are sent to the subsea compressor controller 22. The control action is, for example, to initiate opening of the anti-surge valve. If the compressor controller 22 receives a remote control command from the topside control unit, the remote control command is followed, block 50 and 52. If the compressor controller 22 does not receive a remote control command from the topside control unit, subsea generated control command is followed, block 54. In this case, the remote anti-surge and compressor motor speed controller and subsea compressor controller 22 generate subsea control commands based on measured process parameters from the process sensors 8-10.

Figure 7:
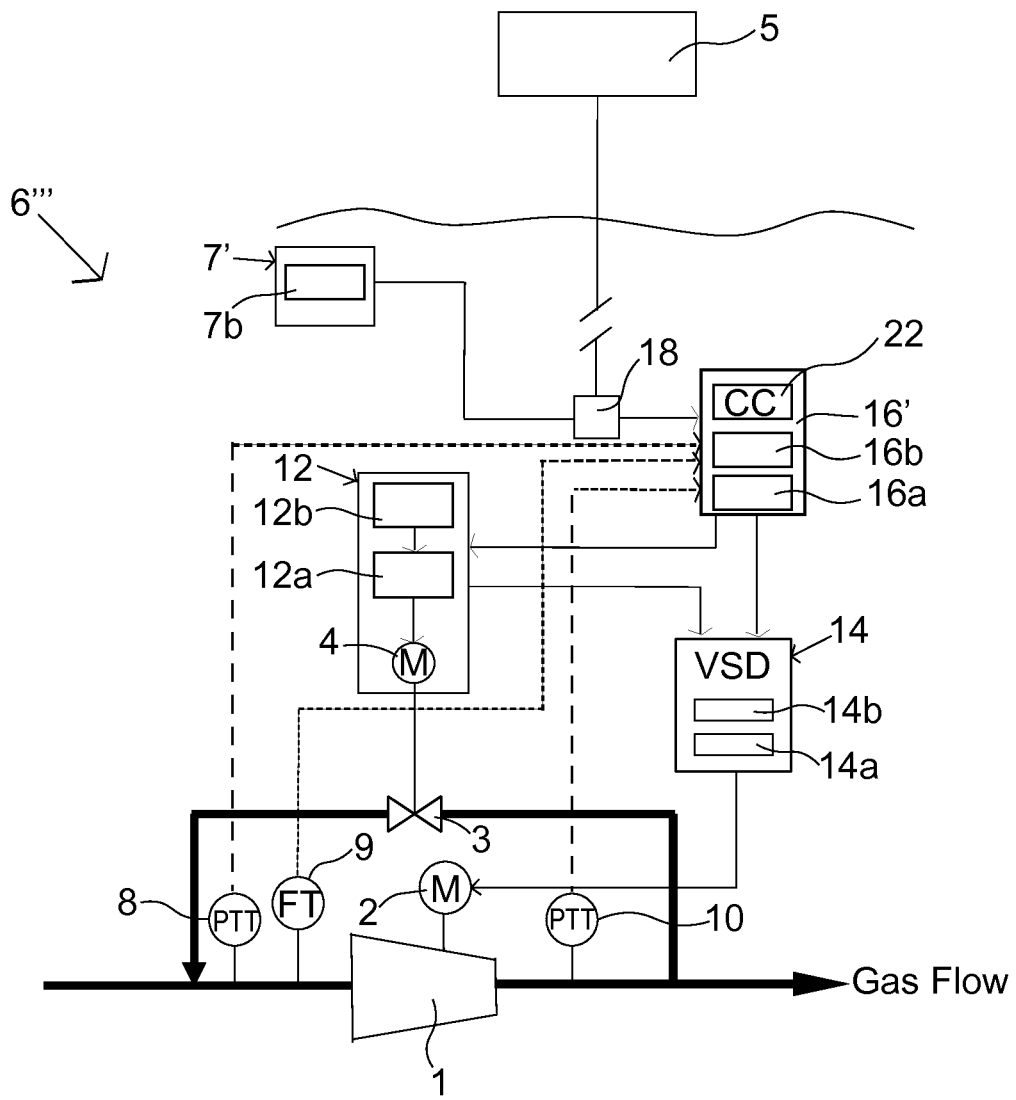
FIG. 7 shows a subsea compression system including a control system.

FIG. 7 shows a subsea compression system including a subsea control system 6''' according to an embodiment of the invention. In this embodiment of the invention, the control system comprises a switchgear 16' connected to the variable speed drive 14 for turning on and off the variable speed drive, and the compressor controller 22 is integrated in the switchgear. The switchgear 16' comprises power electronic components 16a including high voltage circuit breakers for turning on and off the incoming power to the variable speed drive 14, and an embedded controller 16B comprising a sensor interface 40, a processing unit 42, and an output interface 44, as shown in FIG. 4. The sensor interface of the switchgear 16' is connected to the process sensors 8, 9, 10. The processing unit is configured to execute the control modules of the compressor controller 22. The switchgear 16' is further configured to receive control commands, such as commands to turn ON/OFF the incoming power to the variable speed drive. In this embodiment, the switchgear is configured to receive the control commands from the topside control system 5. In an alternative embodiment, the switchgear may be configured to receive the control commands from the compressor controller 22. The output interface of the switchgear 16' is further connected to the anti-surge actuator 12. The switchgear 16' is configured to send control commands to the anti-surge actuator 12 and speed commands to the VSD 14.

Figure 8:
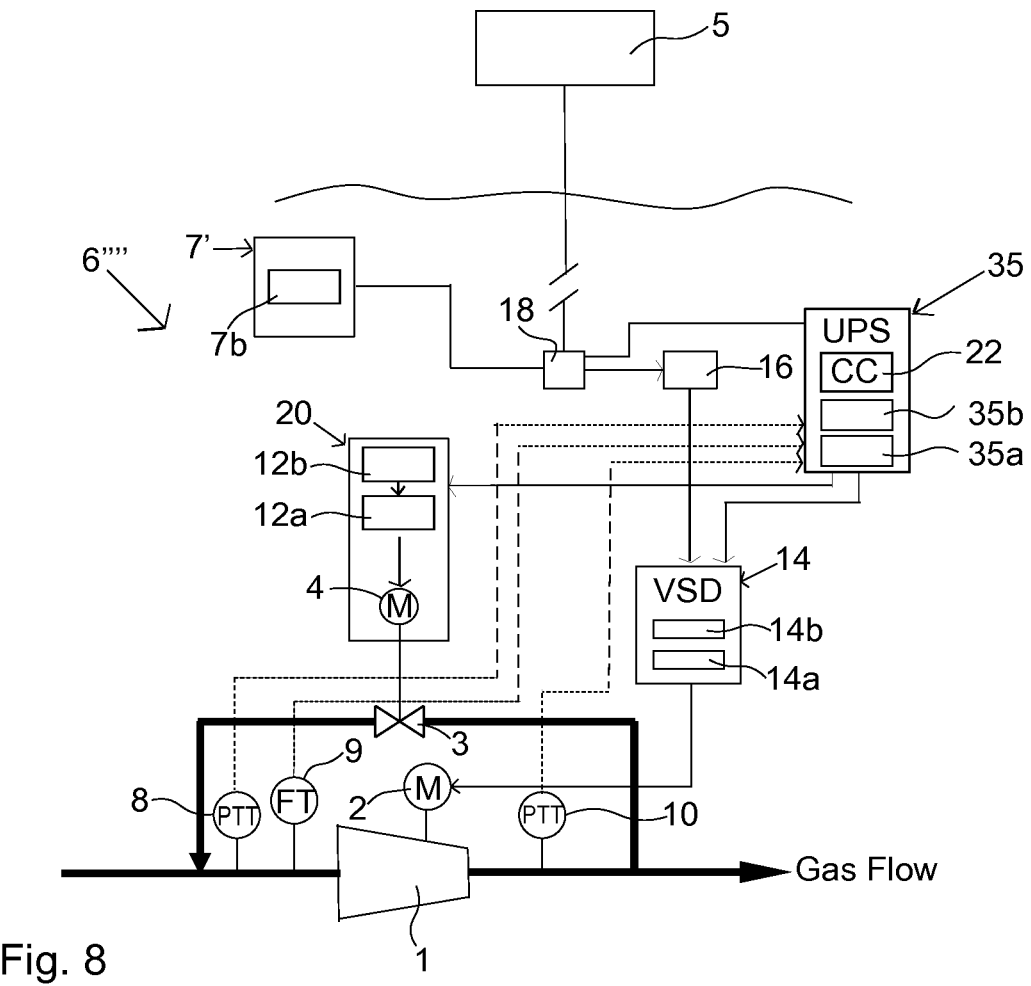
FIG. 8 shows a subsea compression system including a control system.

FIG. 8 shows a subsea compression system including a subsea control system 6'''' according to an embodiment of the invention. In this embodiment of the invention, the control system comprises an Uninterruptible Power Supply unit (UPS) 35 for providing emergency power to the subsea control system 6'''', e.g. power to the electric actuators, and control power for the VSD and switchgear. The compressor controller 22 is integrated in the UPS 35. The UPS 35 comprises power electronic components 35A, such as batteries, super capacitors and converters, to provide emergency power to the components of the compression control system, when the main source of power fails. The UPS 35 may further contain a plurality of circuit breakers to turn ON/OFF the emergency power supply to the components of the control system. The UPS 35 further comprises an embedded controller 35B comprising a sensor interface 40, a processing unit 42, and an output interface 44, as shown in FIG. 4. The sensor interface of the UPS 35 is connected to the process sensors 8, 9, 10. The processing unit of the UPS is configured to execute the control modules of the compressor controller 22. The UPS is configured to receive control commands, such as commands to turn ON/OFF the emergency power supply to the components of the control system. In this embodiment, the UPS receives the control commands from the topside control system 5. In an alternative embodiment, the UPS may be configured to receive the control commands from the compressor controller 22.

The output interface of the UPS is connected to the anti-surge actuator 12 and the VSD 14. The UPS 35 is configured to generate and send control commands to the anti-surge actuator 12, and to generate and send speed commands to the VSD 14.

Figure 9:
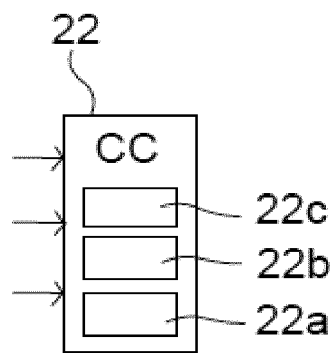
FIG. 9 shows an example of a compressor controller.

FIG. 9 shows an example of a compressor controller 22 configured to generate control commands for controlling a compression system. The compressor controller 22 is arranged to receive signals from a plurality of sensors, the signals corresponding to measurements of the process parameters. The compressor controller 22 comprises one or more software control modules 22A-C for controlling the compression system. In this embodiment, the compressor controller 22 comprises a surge control module 22A configured to generate control commands for opening and closing of the anti-surge valve in order to prevent surge of the compressor, and a motor control module 22B configured to generate speed commands for the compressor motor 2. The surge control module 22A and the motor control module 22B can be parts of the same software module, as disclosed in FIG. 5. The compressor controller 22 may include further control modules 22C controlling other electric devices in the compression system, for example a control module for generating position commands to other types of valves in the compression system, such as an isolation valve.

The present invention is not limited to the embodiments disclosed above but may be varied and modified within the scope of the following claims. For example, the compressor controller 22 can be integrated in an actuator of one of the isolation valves.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A subsea compression system including a compressor and an electric motor driving the compressor, the subsea compression system comprising:
   a control system comprising a topside control system and a subsea control system, wherein the subsea control system comprises:
      a plurality of process sensors configured to measure process parameters of the compression system;
      a control unit comprising control hardware, the control hardware configured to operate at least one of the plurality of process sensors; and
      a compressor controller embedded within a housing of an electric device, the compressor controller configured to generate control commands for controlling the electric motor and a valve based on measurements of the process parameters from the sensors, wherein the compressor controller comprises a surge control module that generates a control command for an anti-surge valve and an actuator control module that controls an actuator motor in response to the control command from the surge control module.

2. The compression system according to claim 1, wherein the anti-surge valve is configured to prevent surge of the compressor, and the surge control module is configured to generate control commands for opening and closing of the anti-surge valve based on measurements of the process parameters in order to prevent surge of the compressor.

3. The compression system according to claim 1, wherein the electric device is an anti-surge actuator or a variable speed drive.

4. The compression system according to claim 1, wherein the electric device includes device hardware and software for influencing a part of the gas compression system, and the electric device is arranged to receive measurements from the process sensors, and wherein the electric device is any of: an actuator configured to control the position of the valve, a variable speed drive configured to control the speed of the motor driving the compressor by adjusting the frequency of the power supplied to the motor, a switchgear connected to the variable speed drive for turning on and off the variable speed drive, or an uninterruptible power supply for providing emergency power to the control system.

5. The compression system according to claim 4, wherein the device hardware of the electric device comprises a processing unit, a sensor interface, and an output interface.

6. The compression system according to claim 5, wherein the sensor interface of the electric device is connected to the process sensors, the compressor controller comprises one or more software control modules configured to generate the control commands, and the processing unit of the electric device is configured to execute the control modules of the compressor controller.

7. The compression system according to claim 4, wherein the compressor controller comprises a motor control module configured to generate speed commands for the motor based on measurements of the process parameters.

8. The compression system according to claim 7, wherein the electric device is a variable speed drive controlling the speed of the motor driving the compressor by adjusting the frequency of the power supplied to the motor in response to speed commands from the motor control module, the variable speed drive comprises a sensor interface arranged to receive measurements from the process sensors, and the compressor controller is integrated in the variable speed drive.

9. The compression system according to claim 4, wherein the electric device is an anti-surge actuator configured to actuate the anti-surge valve in response to the control commands from the surge control module, and the anti-surge actuator comprises a sensor interface arranged to receive measurements from the process sensors, and the compressor controller is integrated in the anti-surge actuator.

10. The compression system according to claim 4, wherein the electric device is a switchgear connected to the variable speed drive for turning on and off the variable speed drive, and the compressor controller is integrated in the switchgear.

11. The compression system according to claim 4, wherein the electric device is an uninterruptible power supply unit for providing emergency power to the control system, and the compressor controller is integrated in the uninterruptible power supply unit.

12. The compression system according to claim 1, wherein the compressor controller is configured to receive remote control commands from the topside control system disposed above sea and follow the received remote control commands or to generate subsea control commands for controlling the electric motor and the valve based on measurements from the process sensors in absence of remote control commands from the topside control system.

13. A subsea gas compression system comprising:
   a compressor;
   an electric motor driving the compressor;
   at least one valve configured to control a flow through the compressor; and
   a control system configured to control the compressor, the control system comprising:
      a plurality of process sensors configured to measure process parameters of the compression system;
      a control unit comprising control hardware, the control hardware configured to operate at least one of the plurality of process sensors; and
      a compressor controller embedded within a housing of an electric device, the compressor controller configured to generate control commands for controlling the electric motor and a valve based on measurements of the process parameters from the sensors, wherein the compressor controller comprises a surge control module that generates a control command for an anti-surge valve and an actuator control module that controls an actuator motor in response to the control command from the surge control module.

14. The compression system according to claim 13, wherein the electric device includes device hardware and software for influencing a part of the gas compression system, and the electric device is arranged to receive measurements from the process sensors, the device hardware of the electric device is utilized for storing and executing the compressor controller, and wherein the electric device is any of: an actuator configured to control the position of the valve, a variable speed drive configured to control the speed of the motor driving the compressor by adjusting the frequency of the power supplied to the motor, a switchgear connected to the variable speed drive for turning on and off the variable speed drive, or an uninterruptible power supply for providing emergency power to the control system.

15. The compression system according to claim 14, wherein the compressor controller is configured to receive remote control commands from a topside control system disposed above sea and follow the received remote control commands or to generate subsea control commands for controlling the electric motor and the valve based on measurements from the process sensors in absence of remote control commands from the topside control system.

\* \* \* \* \*